(12) United States Patent
Jing et al.

(10) Patent No.: US 7,351,471 B2
(45) Date of Patent: *Apr. 1, 2008

(54) FLUOROPOLYMER COATING COMPOSITIONS WITH MULTIFUNCTIONAL FLUOROALKYL CROSSLINKERS FOR ANTI-REFLECTIVE POLYMER FILMS

(75) Inventors: Naiyong Jing, Woodbury, MN (US); Chuntao Cao, Woodbury, MN (US); Tatsuo Fukushi, Woodbury, MN (US); Timothy J. Tatge, Crystal, MN (US); Christopher B. Walker, Jr., St. Paul, MN (US); Thomas P. Klun, Lakeland, MN (US); William J. Schultz, North Oaks, MN (US); Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/026,754

(22) Filed: Dec. 30, 2004

(65) Prior Publication Data

US 2005/0182199 A1    Aug. 18, 2005

(51) Int. Cl.
 B32B 27/00    (2006.01)
 C08F 8/18    (2006.01)
(52) U.S. Cl. ................ 428/339; 525/326.3; 525/326.4
(58) Field of Classification Search ............ 525/326.3, 525/326.4; 428/339
 See application file for complete search history.

(56) References Cited

U.S. PATENT DOCUMENTS

| | | | |
|---|---|---|---|
| 3,250,808 A | 5/1966 | Moore, Jr. et al. | |
| 3,676,192 A | 7/1972 | Hahn | |
| 3,833,368 A | 9/1974 | Land et al. | |
| 3,894,118 A | 7/1975 | Aronoff et al. | |
| 4,000,356 A | 12/1976 | Weisgerber et al. | |
| 4,214,060 A | 7/1980 | Apotheker et al. | |
| 4,262,072 A | 4/1981 | Wendling et al. | |
| 4,654,233 A | 3/1987 | Grant et al. | |
| 4,803,147 A * | 2/1989 | Mueller et al. .......... 430/288.1 | |
| 4,855,184 A | 8/1989 | Klun et al. | |
| 5,148,511 A | 9/1992 | Savu et al. | |
| 5,214,100 A | 5/1993 | Abele et al. | |
| 5,476,717 A | 12/1995 | Floch | |
| 5,733,981 A | 3/1998 | Coggio et al. | |
| 5,846,650 A | 12/1998 | Ko et al. | |
| 6,080,487 A | 6/2000 | Coggio et al. | |
| 6,132,861 A | 10/2000 | Kang et al. | |
| 6,224,949 B1 | 5/2001 | Wright et al. | |
| 6,238,798 B1 | 5/2001 | Kang et al. | |
| 6,245,833 B1 | 6/2001 | Kang et al. | |
| 6,254,973 B1 | 7/2001 | Yoshida et al. | |
| 6,270,901 B1 | 8/2001 | Parsonage et al. | |
| 6,299,799 B1 | 10/2001 | Craig et al. | |
| 6,343,865 B1 | 2/2002 | Suzuki | |
| 6,346,300 B1 | 2/2002 | Ruepping | |
| 6,346,328 B1 | 2/2002 | Parsonage et al. | |
| 6,379,788 B2 | 4/2002 | Choi et al. | |
| 6,429,249 B1 | 8/2002 | Chen et al. | |
| 6,464,822 B1 | 10/2002 | Choi et al. | |
| 6,497,961 B2 * | 12/2002 | Kang et al. .................. 428/421 |
| 6,572,693 B1 | 6/2003 | Wu et al. | |
| 6,630,407 B2 | 10/2003 | Keil et al. | |
| 6,680,357 B1 | 1/2004 | Hedhli et al. | |
| 6,685,793 B2 | 2/2004 | Jing | |
| 6,734,227 B2 | 5/2004 | Jing et al. | |
| 6,753,087 B2 | 6/2004 | Jing et al. | |
| 6,794,469 B2 | 9/2004 | Obayashi et al. | |
| 2001/0033934 A1 | 10/2001 | Port et al. | |
| 2001/0050741 A1 | 12/2001 | Hokazono et al. | |
| 2002/0001710 A1 | 1/2002 | Kang et al. | |
| 2002/0197481 A1 | 12/2002 | Jing et al. | |
| 2003/0049343 A1 | 3/2003 | Foreman et al. | |
| 2003/0077454 A1 | 4/2003 | Jing | |
| 2003/0120008 A1 | 6/2003 | Obayashi et al. | |
| 2004/0019176 A1 | 1/2004 | Araki et al. | |
| 2004/0114248 A1 | 6/2004 | Hokazono et al. | |
| 2004/0124396 A1 | 7/2004 | Flynn et al. | |
| 2004/0196558 A1 | 10/2004 | Takahashi et al. | |
| 2005/0014900 A1 * | 1/2005 | Park ........................... 525/191 |
| 2005/0038137 A1 | 2/2005 | Yoshihara et al. | |
| 2005/0136252 A1 | 6/2005 | Chisholm et al. | |
| 2005/0165168 A1 * | 7/2005 | Park ........................... 525/165 |
| 2005/0222337 A1 * | 10/2005 | Park ........................... 525/199 |
| 2005/0249942 A1 | 11/2005 | Coggio et al. | |
| 2006/0142492 A1 * | 6/2006 | Park ........................... 525/199 |
| 2006/0147723 A1 | 7/2006 | Jing et al. | |
| 2006/0148996 A1 * | 7/2006 | Coggio et al. ............. 525/276 |

FOREIGN PATENT DOCUMENTS

| | | |
|---|---|---|
| EP | 0161581 | 11/1985 |
| EP | 0243605 | * 11/1987 |
| EP | 0 398 241 A2 | 11/1990 |
| EP | 0 407 937 A1 | 1/1991 |
| EP | 0428133 | 5/1991 |

(Continued)

OTHER PUBLICATIONS

U.S. Appl. No. 11/009,181, filed Dec. 10, 2004.

(Continued)

Primary Examiner—Jeffrey Mullis
(74) Attorney, Agent, or Firm—Carolyn A. Fischer

(57) ABSTRACT

An economic, optically transmissive, stain and ink repellent, durable low refractive index fluoropolymer composition for use in an antireflection film or coupled to an optical display. In one aspect of the invention, the composition is formed from the reaction product of a fluoropolymer and a fluoroalkyl containing multi-olefinic crosslinker. In another aspect of the invention, the composition further includes surface modified inorganic nanoparticles.

19 Claims, 1 Drawing Sheet

FOREIGN PATENT DOCUMENTS

| | | | |
|---|---|---|---|
| EP | 0457903 | * | 6/1991 |
| EP | 0488627 | | 6/1992 |
| EP | 0570254 | | 11/1993 |
| EP | 0339880 | | 12/1993 |
| EP | 0863128 | | 9/1998 |
| EP | 0953584 | | 11/1999 |
| EP | 1279443 | | 1/2003 |
| EP | 1460091 | | 9/2004 |
| JP | 2003-183322 | * | 7/2003 |
| WO | WO 93/21010 | | 10/1993 |
| WO | WO 94/06837 | | 3/1994 |
| WO | WO 00/12574 | | 3/2000 |
| WO | WO 02/08457 | | 3/2002 |
| WO | WO 03/054031 | | 7/2003 |

OTHER PUBLICATIONS

Modern Fluoropolymers, J. Scheirs Ed, (1997), J Wiley Science, Chapters 2 and 13. (ISBN 0-471-97055-7).

Banks, R.E. et al., Fluoropolymers; Organofluorine Chemistry; 1994; pp. 380-396; Plenum Press; New York and London.

U.S. Appl. No. 60/569,351.

Dec. 2003 Disclosure to Japan.

Schmiegel, W., Crosslinking of Elastomeric Vinylidene Fluoride Copolymers with Nucleophiles; Angewandre Chemie 1979 vol. 76/77 39-65.

S.C. Kim, L.H. Sperling; IPNS Around the World Science and Engineering, The Current Status of Interpenetrating Polymer Networks 1997, J. Wiley & Sons Ltd., pp. 1-5.

* cited by examiner

FLUOROPOLYMER COATING COMPOSITIONS WITH MULTIFUNCTIONAL FLUOROALKYL CROSSLINKERS FOR ANTI-REFLECTIVE POLYMER FILMS

TECHNICAL FIELD AND INDUSTRIAL APPLICABILITY OF THE INVENTION

The present invention relates to antireflective films and more specifically to low refractive index fluoropolymer coating compositions for use in antireflection polymer films.

BACKGROUND OF THE INVENTION

Antireflective polymer films ("AR films") are becoming increasingly important in the display industry. New applications are being developed for low reflective films applied to substrates of articles used in the computer, television, appliance, mobile phone, aerospace and automotive industries.

AR films are typically constructed by alternating high and low refractive index ("RI") polymer layers in order to minimize the amount of light that is reflected from the optical display surface. Desirable product features in AR films for use on optical goods are a low percentage of reflected light (e.g. 1.5% or lower) and durability to scratches and abrasions. These features are obtained in AR constructions by maximizing the delta RI between the polymer layers while maintaining strong adhesion between the polymer layers.

It is known that the low refractive index polymer layers used in AR films can be derived from fluorine containing polymers ("fluoropolymers" or "fluorinated polymers"). Fluoropolymers provide advantages over conventional hydrocarbon-based materials relative to high chemical inertness (in terms of acid and base resistance), dirt and stain resistance (due to low surface energy) low moisture absorption, and resistance to weather and solar conditions.

The refractive index of fluorinated polymer coating layers can be dependent upon the volume percentage of fluorine contained within the layer. Increased fluorine content in the layers typically decreases the refractive index of the coating layer. However, organic solvent soluble fluoropolymers with low crystallinity generally have undesired mechanical properties, such as poor scratching resistance and poor the interfacial adhesion of the fluoropolymer layer to other polymer or substrate layers to which the layer is coupled.

Thus, it is highly desirable to form a low refractive index layer for an antireflection film having increased fluorine content, and hence lower refractive index, while improving mechanical properties by crosslinking and by enhancing interfacial adhesion to accompanying layers or substrates.

SUMMARY OF THE INVENTION

The present invention provides an economic and durable low refractive index fluoropolymer composition for use as a low refractive index film layer in an antireflective film for an optical display. The low refractive index composition forms layers having strong interfacial adhesion to a high index refractive layer and/or a substrate material.

In one aspect of the invention, a low refractive index layer is formed from the reaction product of a fluoropolymer and a fluoroalkyl containing multi-olefinic crosslinker. The introduction of the fluoro-component to the multi-olefinic crosslinker enhances the low surface energy characteristics of the coating, while maintaining sufficient crosslinking between fluoropolymer and the multi-olefinic crosslinker. The low surface energy characteristic is advantageous since it provides a stain-resistant and easy-to-clean feature to the coating. Moreover, by the nature of the fluoroalkyl multi-acrylate, the low refractive index properties of the coating are maintained or even further enhanced. The fluoroalkyl-component may also help to eliminate the need for a compatibilizer between the fluoropolymer and the multi-olefinic crosslinker.

Further, the mechanical strength and scratch resistance the low refractive index composition can be enhanced by the addition of surface functionalized nanoparticles into the fluoropolymer compositions. Providing functionality to the nanoparticles enhances the interactions between the fluoropolymers and such functionalized particles.

The present invention also provides an article having an optical display that is formed by introducing the antireflection film having a layer of the above low refractive index compositions to an optical substrate. The resultant optical device has an outer coating layer that is easy to clean, durable, and has low surface energy.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

Figure 1:
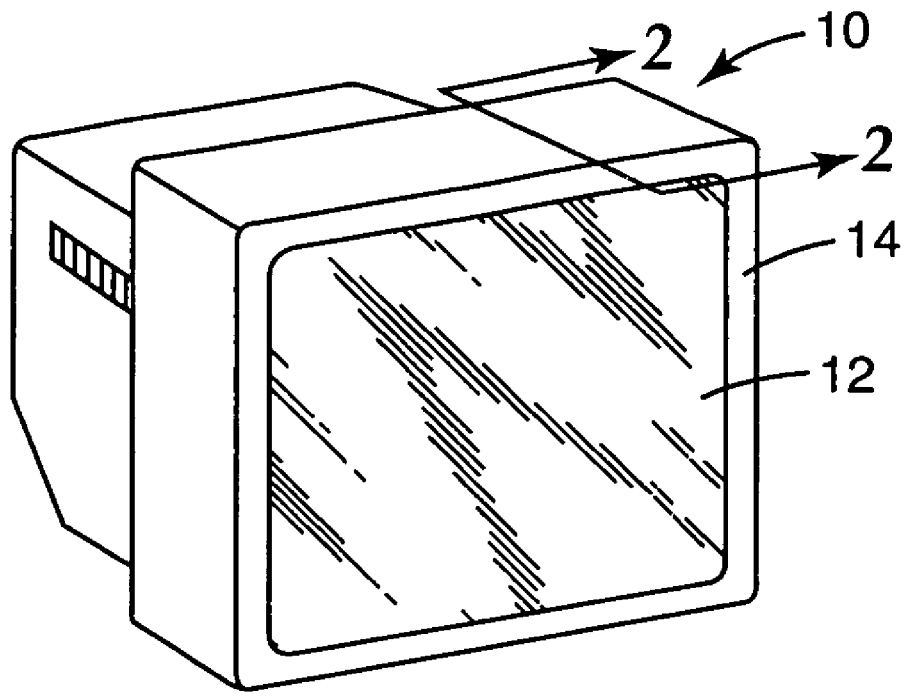
FIG. 1 is perspective view of an article having an optical display.

For the following defined terms, these definitions shall be applied, unless a different definition is given in the claims or elsewhere in the specification.

The term "polymer" will be understood to include polymers, copolymers (e.g. polymers using two or more different monomers), oligomers and combinations thereof, as well as polymers, oligomers, or copolymers that can be formed in a miscible blend.

As used herein, the term "ceramer" is a composition having inorganic oxide particles, e.g. silica, of nanometer dimensions dispersed in a binder matrix. The phrase "ceramer composition" is meant to indicate a ceramer formulation in accordance with the present invention that has not been at least partially cured with radiation energy, and thus is a flowing, coatable liquid. The phrase "ceramer composite" or "coating layer" is meant to indicate a ceramer formulation in accordance with the present invention that has been at least partially cured with radiation energy, so that it is a substantially non-flowing solid. Additionally, the phrase "free-radically polymerizable" refers to the ability of monomers, oligomers, polymers or the like to participate in crosslinking reactions upon exposure to a suitable source of curing energy.

The term "low refractive index", for the purposes of the present invention, shall mean a material when applied as a layer to a substrate forms a coating layer having a refractive index of less than about 1.5, and more preferably less than about 1.45, and most preferably less than about 1.42.

The term "high refractive index", for the purposes of the present invention, shall mean a material when applied as a layer to a substrate forms a coating layer having a refractive index of greater than about 1.5.

The recitation of numerical ranges by endpoints includes all numbers subsumed within the range (e.g. the range 1 to 10 includes 1, 1.5, 3.33, and 10).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly indicates otherwise.

Unless otherwise indicated, all numbers expressing quantities of ingredients, measurements of properties such as contact angle and so forth as used in the specification and claims are to be understood to be modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as accurately as possible. Any numerical value, however, inherently contains certain errors necessarily resulting from the standard deviations found in their respective testing measurements.

The present invention is directed to antireflection materials used as a portion of optical displays ("displays"). The displays include various illuminated and non-illuminated displays panels wherein a combination of low surface energy (e.g. anti-soiling, stain resistant, oil and/or water repellency) and durability (e.g. abrasion resistance) is desired while maintaining optical clarity. The antireflection material functions to decrease glare and decrease transmission loss while improving durability and optical clarity.

Such displays include multi-character and especially multi-line multi-character displays such as liquid crystal displays ("LCDs"), plasma displays, front and rear projection displays, cathode ray tubes ("CRTs"), signage, as well as single-character or binary displays such as light emitting tubes ("LEDs"), signal lamps and switches. The light transmissive (i.e. exposed surface) substrate of such display panels may be referred to as a "lens." The invention is particularly useful for displays having a viewing surface that is susceptible to damage.

The coating composition, and reactive product thereof, as well as the protective articles of the invention, can be employed in a variety of portable and non-portable information display articles. These articles include, but are not limited by, PDAs, LCD TV's (direct lit and edge lit), cell phones (including combination PDA/cell phones), touch sensitive screens, wrist watches, car navigation systems, global positioning systems, depth finders, calculators, electronic books, CD and DVD players, projection televisions screens, computer monitors, notebook computer displays, instrument gauges, instrument panel covers, signage such as graphic displays and the like. These devices can have planar viewing faces, or non-planar viewing faces such as slightly curved faces. The above listing of potential applications should not be construed to unduly limit the invention.

Referring now to FIG. 1, a perspective view of an article, here a computer monitor 10, is illustrated according to one preferred embodiment as having an optical display 12 coupled within a housing 14. The optical display 12 is a substantially transparent material having optically enhancing properties through which a user can view text, graphics or other displayed information.

Figure 2:
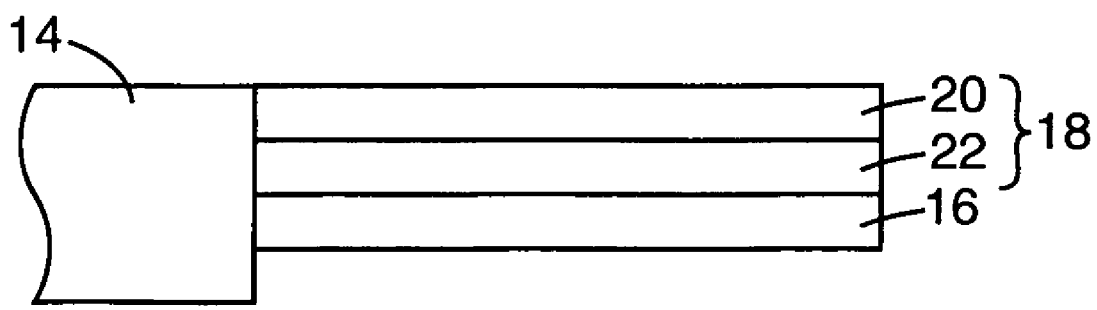
FIG. 2 is a sectional view of the article of FIG. 1 taken along line 2-2 illustrating an antireflection film having a low refractive index layer formed in accordance with a preferred embodiment of the present invention.

As best shown in FIG. 2, the optical display 12 includes an antireflection film 18 coupled (coated) to an optical substrate 16. The antireflection film 18 has at least one layer of a high refraction index layer 22 and a low refractive index layer 20 coupled together such that the low refractive index layer 20 being positioned to be exposed to the atmosphere while the high refractive index layer 22 is positioned between the substrate 16 and low refractive index layer 20.

The optical substrate 16 preferably comprises an inorganic material, such as glass, or a polymeric organic material such as polyethylene terephthalate ("PET"), that are well known to those of ordinary skill in the optical display art. In addition, the substrate 16 may comprise a hybrid material, having both organic and inorganic components.

While not shown, other layers may be incorporated into the optical device, including, but not limited to, other hard coating layers, adhesive layers, and the like. Further, the antireflection material 18 may be applied directly to the substrate 16, or alternatively applied to a release layer of a transferable antireflection film and subsequently transferred from the release layer to the substrate using a heat press or photoradiation application technique.

The high refractive index layer 22 is a conventional carbon-based polymeric composition having a mono and multi-acrylate crosslinking system.

The low refractive index coating composition of the present invention used to form layer 20, in one aspect of the invention, a low refractive index layer is formed from the reaction product of a fluoropolymer and a fluoroalkyl containing multi-olefinic crosslinker. The reaction mechanism for forming the coating composition is described further below as Reaction Mechanism 1.

In another preferred approach, inorganic surface functionalized nanoparticles are added to the low refractive index composition 20 described in the preceding paragraphs to provide increased mechanical strength and scratch resistance to the low index coatings.

The low refractive index composition that is formed in any of the preferred approaches is then applied directly or indirectly to a substrate 16 of a display 12 to form a low refractive index portion 20 of an antireflection coating 18 on the article 10. With the invention, the article 10 has outstanding optical properties, including decreased glare and increased optical transmissivity. Further, the antireflection coating 18 has outstanding durability, as well as ink and stain repellency properties.

The ingredients for forming the various low refractive index compositions are summarized in the following paragraphs, followed by the reaction mechanism for forming the coating according to one preferred approach.

Fluoropolymer

Fluoropolymer materials used in the low index coating may be described by broadly categorizing them into one of two basic classes. A first class includes those amorphous fluoropolymers comprising interpolymerized units derived from vinylidene fluoride (VDF) and hexafluoropropylene (HFP) and optionally tetrafluoroethylene (TFE) monomers. Examples of such are commercially available from 3M Company as Dyneon™ Fluoroelastomer FC 2145 and FT 2430. Additional amorphous fluoropolymers contemplated by this invention are for example VDF-chlorotrifluoroethylene copolymers, commercially known as Kel-F™ 3700, available from 3M Company. As used herein, amorphous fluoropolymers are materials that contain essentially no crystallinity or possess no significant melting point as determined for example by differential scanning calorimetry (DSC). For the purpose of this discussion, a copolymer is defined as a polymeric material resulting from the simultaneous polymerization of two or more dissimilar monomers and a homopolymer is a polymeric material resulting from the polymerization of a single monomer.

The second significant class of fluoropolymers useful in this invention are those homo and copolymers based on fluorinated monomers such as TFE or VDF which do contain a crystalline melting point such as polyvinylidene fluoride (PVDF, available commercially from 3M Company as Dyneon™ PVDF, or more preferable thermoplastic copolymers of TFE such as those based on the crystalline microstructure of TFE-HFP-VDF. Examples of such polymers are those available from 3M under the trade name Dyneon™ Fluoroplastic THV™ 200.

A general description and preparation of these classes of fluoropolymers can be found in Encyclopedia Chemical Technology, *Fluorocarbon Elastomers*, Kirk-Othmer (1993), or in *Modern Fluoropolymers*, J. Scheirs Ed, (1997), J Wiley Science, Chapters 2, 13, and 32. (ISBN 0-471-97055-7).

The preferred fluoropolymers are copolymers formed from the constituent monomers known as tetrafluoroethylene ("TFE"), hexafluoropropylene ("HFP"), and vinylidene fluoride ("VDF," "VF2,"). The monomer structures for these constituents are shown below:

TFE: $CF_2=CF_2$ (1)

VDF: $CH_2=CF_2$ (2)

HFP: $CF_2=CF—CF_3$ (3)

The preferred fluoropolymer consists of at least two of the constituent monomers (HFP and VDF), and more preferably all three of the constituents monomers in varying molar amounts. Additional monomers not depicted in (1), (2) or (3) but also useful in the present invention include perfluorovinyl ether monomers of the general structure $CF_2=CF—OR_f$, wherein $R_f$ can be a branched or linear perfluoroalkyl radicals of 1-8 carbons and can itself contain additional heteroatoms such as oxygen. Specific examples are perfluoromethyl vinyl ether, perfluoropropyl vinyl ethers, perfluoro (3-methoxy-propyl) vinyl ether. Additional examples are found in Worm (WO 00/12574), assigned to 3M, and in Carlson (U.S. Pat. No. 5,214,100).

For the purposes of the present invention, crystalline copolymers with all three constituent monomers shall be hereinafter referred to as THV, while amorphous copolymers consisting of VDF-HFP and optionally TFE is hereinafter referred to as FKM, or FKM elastomers as denoted in ASTM D 1418. THV and FKM elastomers have the general formula (4):

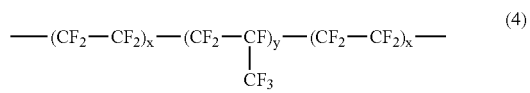

wherein x, y and z are expressed as molar percentages.

For fluorothermoplastics materials (crystalline) such as THV, x is greater than zero and the molar amount of y is typically less than about 15 molar percent. One commercially available form of THV contemplated for use in the present invention is Dyneon™ Fluorothermoplastic THV™ 220, a polymer that is manufactured by Dyneon LLC, of St. Paul, Minn. Other useful fluorothermoplastics meeting these criteria and commercially available, for example, from Dyneon LLC, St. Paul, Minn., are sold under the trade names THV™ 200, THV™ 500, and THV™ 800. THV™ 200 is most preferred since it is readily soluble in common organic solvents such as MEK and this facilitates coating and processing, however this is a choice born out of preferred coating behavior and not a limitation of the material used a low refractive index coating.

In addition, other fluoroplastic materials not specifically falling under the criteria of the previous paragraph are also contemplated by the present invention. For example, PVDF-containing fluoroplastic materials having very low molar levels of HFP are also contemplated by the present invention and are sold under the trade name Dyneon™ PVDF 6010 or 3100, available from Dyneon LLC, of St. Paul, Minn.; and Kynar™ 740, 2800, 9301, available from Elf Atochem North America Inc. Further, other fluoroplastic materials are specifically contemplated wherein x is zero and wherein y is between about 0 and 18 percent. Optionally the microstructure shown in (4) can also contain additional non-fluorinated monomers such as ethylene, propylene, or butylene. Examples of which are commercially available as Dyneon™ ETFE and Dyneon™ HTE fluoroplastics.

For fluoroelastomers compositions (amorphous) useful in the present invention, x can be zero so long as the molar percentage of y is sufficiently high (typically greater than about 18 molar percent) to render the microstructure amorphous. One example of a commercially available elastomeric compound of this type is available from Dyneon LLC, St. Paul, Minn., under the trade name Dyneon™ Fluoroelastomer FC 2145.

Additional fluoroelastomer compositions useful in the present invention exist where x is greater than zero. Such materials are often referred to as elastomeric TFE containing terpolymers. One example of a commercially available elastomeric compound of this type is available from Dyneon LLC, St. Paul, Minn., and is sold under the trade name Dyneon™ Fluoroelastomer FT 2430.

In addition, other fluorelastomeric compositions not classified under the preceding paragraphs are also useful in the present invention. For example, propylene-containing fluoroelastomers are a class useful in this invention. Examples of propylene-containing fluoroelastomers known as base resistant elastomers ("BRE") and are commercially available from Dyneon under the trade name Dyneon™ BRE 7200 available from 3M Company of St. Paul, Minn. Other examples of TFE-propylene copolymer can also be used are commercially available under the tradename Aflaf™, available from Asahi Glass Company of Charlotte, N.C.

In one preferred approach, these polymer compositions further comprise reactive functionality such as halogen-containing cure site monomers ("CSM") and/or halogenated endgroups, which are interpolymerized into the polymer microstructure using numerous techniques known in the art. These halogen groups provide reactivity towards the other components of coating mixture and facilitate the formation of the polymer network. Useful halogen-containing monomers are well known in the art and typical examples are found in U.S. Pat. No. 4,214,060 to Apotheker et al., European Patent No. EP398241 to Moore, and European Patent No. EP407937B1 to Vincenzo et al.

In addition to halogen containing cure site monomers, it is conceivable to incorporate nitrile-containing cure site monomers in the fluoropolymer microstructure. Such CSM's are particularly useful when the polymers are perfluorinated, i.e. contain no VDF or other hydrogen containing monomers. Specific nitrile-containing CSM's contemplated by this invention are described in Grootaret et al. (U.S. Pat. No. 6,720,360, assigned to 3M).

Optionally halogen cure sites can be introduced into the polymer microstructure via the judicious use of halogenated chain transfer agents which produce fluoropolymer chain ends that contain reactive halogen endgroups. Such chain transfer agents ("CTA") are well known in the literature and typical examples are: Br—$CF_2CF_2$—Br, $CF_2Br_2$, $CF_2I_2$, $CH_2I_2$. Other typical examples are found in U.S. Pat. No. 4,000,356 to Weisgerber. Whether the halogen is incorporated into the polymer microstructure by means of a CSM or CTA agent or both is not particularly relevant as both result in a fluoropolymer which is more reactive towards UV crosslinking and coreaction with other components of the network such as the acrylates. An advantage to use of cure site monomers in forming the co-crosslinked network, as opposed to a dehydrofluorination approach (discussed below), is that the optical clarity of the formed polymer layer is not compromised since the reaction of the acrylate and the fluoropolymer does not rely on unsaturation in the polymer backbone in order to react. Thus, a bromo-containing fluoroelastomer such as Dyneon™ E-15472, E-18905, or E-18402 available from Dyneon LLC of St. Paul, Minn., may be used in conjunction with, or in place of, THV or FKM as the fluoropolymer.

In another embodiment the fluoropolymer microstructure is first dehydrofluorinated by any method that will provide sufficient carbon-carbon unsaturation of the fluoropolymer to create increased bond strength between the fluoropolymer and a hydrocarbon substrate or layer. The dehydrofluorination process is a well-known process to induced unsaturation and it is used most commonly for the ionic crosslinking of fluoroelastomers by nucleophiles such as diphenols and diamines. This reaction is an inherent property of VDF containing elastomers or THV. A descriptions can be found in *The Chemistry of Fluorocarbon Elastomer*, A. L. Logothetis, *Prog. Polymer Science* (1989), 14, 251. Furthermore, such a reaction is also possible with primary and secondary aliphatic monofunctional amines and will produce a DHF-fluoropolymer with a pendent amine side group. However, such a DHF reaction is not possible in polymers which do not contain VDF units since they lack the ability to lose HF by such reagents.

In addition to the main types of fluoropolymers useful in the context of this invention, there is a third special case involving the use of perfluoropolymers or ethylene containing fluoropolymers which are exempt form the DHF addition reaction described above but nonetheless are reactive photochemically with amines to produce low index fluoropolymer coatings. Examples of such are copolymers of TFE with HFP or perfluorovinyl ethers, or 2,2-bistrifluoromethyl-4,5-difluoro 1,3 dioxole. Such perfluoropolymers are commercially available as Dyneon™ Perfluoroelastomer, DuPont Kalrez™ or DuPont Teflon™ AF. Examples of ethylene containing fluoropolymers are known as Dyneon™ HTE or Dyneon™, ETFE copolymers. Such polymers are described in the above-mentioned reference of Scheirs Chapters 15, 19 and 22. Although these polymers are not readily soluble in typical organic solvents, they can be solubilized in such perfluoroinated solvents such as HFE 7100 and HFE 7200 (available from 3M Company, St. Paul, Minn.). These types of fluoropolymers are not easily bonded to other polymers or substrates. However the work of Jing et al, in U.S. Pat. Nos. 6,685,793 and 6,630,047, teaches methods where by such materials can be photochemcially grafted and bonded to other substrates in the presence of amines. However in these particular applications the concept of solution coatings and co-crosslinking in the presence of multifunctional acrylates is not contemplated.

Of course, as one of ordinary skill recognizes, other fluoropolymers and fluoroelastomers not specifically listed above may be available for use in the present invention. As such, the above listings should not be considered limiting, but merely indicative of the wide variety of commercially available products that can be utilized.

The compatible organic solvent that is utilized in the preferred embodiments of the present invention is methyl ethyl ketone ("MEK"). However, other organic solvents including fluorinated solvents may also be utilized, as well as mixtures of compatible organic solvents, and still fall within the spirit and scope of the present invention. For example, other organic solvents contemplated include acetone, cyclohexanone, methyl isobutyl ketone ("MIBK"), methyl amyl ketone ("MAK"), tetrahydrofuran ("THF"), methyl acetate, isopropyl alcohol ("IPA"), and mixtures thereof, may also be utilized.

Multi-Olefinic Crosslinking Agent

The crosslinking agent of the present invention is based on a multi-olefinic crosslinking agent. More preferably, the multi-olefinic crosslinker in one that can be homopolymerizable. Most preferably, the multi-olefinic crosslinker is a fluoroalkyl-containing multi-olefinic crosslinker.

Useful fluoroalkyl containing multi-olefinic crosslinkers including fluoroalkyl containing multi-acrylic crosslinkers, for example, fluoroalkylene substituted acrylate or multi-acrylate mono or multi-(meth)acryl compound bearing at least one monovalent C1 to C8 fluoroalkyl moiety (such as CF3-, C2F5-, C3F7-, C4F9-, C5F11-, C6F13-, C7F15- or C8F17-) or poly(hexafluoropropylene oxide) (HFPO) moiety is added to a fluoropolymer composition optionally containing inorganic particles ("ceramer" hard coating).

The free-radically reactive fluoroalkyl or fluoroalkylene group-containing crosslinkers are of the respective chemical formula: $R_fQ(X)_n$ and $(X)_nQR_{f2}Q(X)_n)$, where $R_f$ is a fluoroalkyl, $R_{f2}$ is a fluoroalkylene or perfluoropolyether, Q is a connecting group comprising an alkylene, arylene, arylene-alkylene, or alkylene-arylene group and may comprise a straight or branched chain connecting group which may contain heteroatoms such as O,N, and S, X is a free-radically reactive group selected from (meth)acryl, allyl, or vinyl groups and n is 2 to 3. Typical Q group include: —$SO_2N(R)CH_2CH_2$—; —$SO_2N(CH_2CH_2)_2$—; —$(CH_2)_m$—; —$CH_2O(CH_2)_3$—; and —$C(O)N(R)CH_2CH_2$—, where R is H or lower alkyl of 1 to 8 carbon atoms and m is 1 to 6. Preferably the fluoroalkyl or fluoroalkylene group is a perfluoroalkyl or perfluoroalkylene group.

One preferred class of fluoroalkyl- or alkylene-substituted crosslinker is the perfluorobutyl-substituted acrylate. Exemplary, non-limiting perfluorobutyl-substituted acrylate in the present invention includes one or more of $C_4F_8(CH_2CH_2OC(O)CH=CH_2)_2$, $C_4F_9SO_2N(CH_2CH_2OC(O)CH=CH_2)_2$, or $C_4F_8(CH_2OC(O)C(CH_3)=CH2)2$.

Other fluorochemical (meth)acrylates that may be used alone, or as mixtures, are described in U.S. Pat. No. 6,238,798, to Kang et al., and assigned to Minnesota Mining and Manufacturing Company of St. Paul, Minn., and herein incorporated by reference.

HFPO Moiety and Compatibilizers

In another preferred embodiment, the coating composition adds one or more multi-olefinic compounds bearing at least one monovalent poly(hexafluoropropylene oxide) (HFPO) moiety and optionally a compatibilizer such as a fluoroalkyl- or fluoroalkylene-substituted mono or multi-acrylate such as $C_4F_9SO_2N(CH_3)CH_2CH_2OC(O)CH=CH_2$, $C_4F_9SO_2N(CH_2CH_2OC(O)CH=CH_2)_2$, or $C_4F_9SO_2N(CH_3)CH_2CH_2OC(O)C(CH_3)=CH_2$, alcohol, olefin, thiol or polythiol to fluoropolymer curing composition. Non-limiting examples of thiol or polythiol type of compatibilizer includes one or more of the following:

$C_4F_9SO_2N(CH_3)CH_2CH_2OC(O)CH_2SH$, $C_4F_9SO_2N(CH_3)CH_2CH_2OC(O)CH_2CH_2SH$, $C_4F_9SO_2N(CH_3)CH_2CH_2SH$, and $C_4F_9SO_2N(CH_3)CH(OC(O)CH_2SH)CH_2OC(O)CH_2SH$.

As used in the examples, unless otherwise noted, "HFPO—" refers to the end group $F(CF(CF_3)CF_2O)_aCF(CF_3)$— of the methyl ester $F(CF(CF_3)CF_2O)_aCF(CF_3)C(O)OCH_3$, wherein "a" averages about 6.8, and the methyl ester has an average molecular weight of 1,211 g/mol, and which can be prepared according to the method reported in U.S. Pat. No. 3,250,808 (Moore et al.), the disclosure of which is incorporated herein by reference, with purification by fractional distillation.

The mono- or multi-olefinic compound bearing at least one monovalent poly(hexafluoropropylene oxide) (HFPO) moiety preferably is in the form of a multiacrylate. These materials are of the formula: $R_{fpe}Q(X)_n$ wherein Rfpe is the residue of a monovalent HFPO moiety, Q is a connecting group comprising an alkylene, arylene, arylene-alkylene, or alkylene-arylene group and may comprise a straight or branched chain connecting group which may contain heteroatoms such as O,N, and S, X is a free-radically reactive group selected from meth(acryl), allyl, or vinyl groups and n is 2 to 3. Typical Q group include: —$(CH_2)_m$—; —$CH_2O(CH_2)_3$—; and —$C(O)NRCH_2CH_2$—, where R is H or lower alkyl of 1 to 4 carbon atoms and m is 1 to 6.

One class of multi-(meth)acryl compound bearing at least one monovalent poly(hexafluoropropylene oxide) (HFPO) moiety comprises compounds described in U.S. Provisional Application No. 60/569,351 entitled "Fluoropolyether Polyacryl Compounds", filed May 7, 2004, the disclosure of which is incorporated by reference.

Other mono- and multi-(meth)acryl compounds bearing at least one monovalent poly(hexafluoropropylene oxide) (HFPO) moiety comprise compounds which are Michael adducts of HFPO amine derivatives with multiacrylates described in U.S. application Ser. No. 10/841,792, entitled "Polymerizable Compositions, Methods Of Making The Same, And Composite Articles Therefrom," filed May 7, 2004, the disclosure of which is incorporated by reference.

Surface Modified Nanoparticles

The mechanical durability of the resultant low refractive index layers 20 can be enhanced by the introduction of surface modified inorganic particles.

These inorganic particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat. The inorganic oxide particles are typically colloidal in size, having an average particle diameter of 5 nanometers to 100 nanometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. Inorganic oxide particles include colloidal silica, colloidal titania, colloidal alumina, colloidal zirconia, colloidal vanadia, colloidal chromia, colloidal iron oxide, colloidal antimony oxide, colloidal tin oxide, and mixtures thereof. Most preferably, the particles are formed of silicon dioxide ($SiO_2$).

The surface particles are modified with polymer coatings designed to have alkyl or fluoroinated alkyl groups, and mixtures thereof, that have reactive functionality towards the fluoropolymer. Such functionalities include mercaptan, vinyl, acrylate and others believed to enhance the interaction between the inorganic particles and low index fluoropolymers, especially those containing chloro, bromo, iodo or alkoxysilane cure site monomers. Specific surface modifying agents contemplated by this invention include but are not limited to 3-methacryloxypropyltrimethoxysilane A174 OSI Specialties Chemical), vinyl trialkoxy silanes such as trimethoxy and triethoxy silane and hexamethydisilizane (available from Aldrich Co).

These vinylidene fluoride containing fluoropolymers are known to enable grafting with chemical species having nucleophilic groups such as —$NH_2$, —SH, and —OH via dehydrofluorination and Michael addition processes.

Photoinitiators and Additives

To facilitate curing, polymerizable compositions according to the present invention may further comprise at least one free-radical photoinitiator. Typically, if such an initiator photoinitiator is present, it comprises less than about 10 percent by weight, more typically less than about 5 percent of the polymerizable composition, based on the total weight of the polymerizable composition.

Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.).

Useful free-radical photoinitiators include, for example, those known as useful in the UV cure of acrylate polymers. Such initiators include benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850","IRGACURE 819" "IRGACURE 2005", "IRGACURE 2010", "IRGACURE 2020" and "DAROCUR 4265". Combinations of two or more photoinitiators may be used. Further, sensitizers such as 2-isopropyl thioxanthone, commercially available from First Chemical Corporation, Pascagoula, Miss., may be used in conjunction with photoinitiator(s) such as "IRGACURE 369".

More preferably, the initiators used in the present invention are either "DAROCURE 1173" or "ESACURE® KB-1", a benzildimethylketal photoinitiator available from Lamberti S.p.A of Gallarate, Spain.

Alternatively, or in conjunction herewith, the use of thermal initiators may also be incorporated into the reaction mixture. Useful free-radical thermal initiators include, for example, azo, peroxide, persulfate, and redox initiators, and combinations thereof.

Those skilled in the art appreciate that the coating compositions can contain other optional adjuvants, such as, surfactants, antistatic agents (e.g., conductive polymers), leveling agents, photosensitizers, ultraviolet ("UV") absorbers, stabilizers, antioxidants, lubricants, pigments, dyes, plasticizers, suspending agents and the like.

The reaction mechanism for forming the low refractive index composition according to one preferred approach (REACTION MECHANISM 1) is described in further detail below:

Reaction Mechanism 1

The low refractive index coating composition of the present invention used to form layer 20, in this preferred approach, is formed by first dissolving a fluoropolymer in a suitable organic solvent and then reactively photo-crosslinking the fluoropolymer with a fluoroalkyl-containing multiolefinic (here acrylate) crosslinker. The mechanism for forming the coating composition involves two distinct steps as described below:

Step 1: Dissolving of Fluoropolymer and Introduction of m Fluoroalkyl Containing Multiolefinic (here acrylate) Crosslinker to Fluoropolymer and Subsequent Application to a Substrate Material In Reaction Mechanism 1, a fluoropolymer as described above is first dissolved in a compatible organic solvent. Preferably, the solution is about 10% by weight fluoropolymer and 90% by weight organic solvent. Optionally, surface modified nanoparticles as described above may be added to the fluoropolymer solution in amounts not exceeding about 5-10% by weight of the overall low refractive index composition.

The compatible organic solvent that is utilized in the preferred embodiments of the present invention is methyl ethyl ketone ("MEK"). However, other organic solvents may also be utilized, as well as mixtures of compatible organic solvents, and still fall within the spirit and scope of the present invention. For example, other organic solvents contemplated include methyl isobutyl ketone ("MIBK"), methyl amyl ketone ("MAK"), tetrahydrofuran ("THF"), isopropyl alcohol ("IPA"), or mixtures thereof, may also be utilized.

Next, the fluoroalkyl-containing multiolefinic (here acrylate) crosslinker is added to the dissolved fluoropolymer. The resultant composition is then applied as a wet layer either (1) directly to an optical substrate or hardcoated optical substrate, or (2) to a high refractive index layer, or (3) to a release layer of a transferable film. The optical substrate could be glass or a polymeric material such as polyethylene terepthalate (PET).

Next, the wet layer is dried at between about 100 and 120 degrees Celsius for about ten minutes to form a dry layer (i.e. coated subject). Preferably, this is accomplished by introducing the substrate having the wet layer to an oven.

Step 2: Photocrosslinking Reaction

Next, the coated subject is irradiated with an ultraviolet light source to induce photocrosslinking of the C=C containing silane compound and the multifunctional (meth) acrylate to the fluoropolymer backbone. Preferably, the coated subject is subjected to ultraviolet radiation such as by H-bulb, D-bulb or by a 254 nanometer (nm) lamp in one or more passes along a conveyor belt to form the low refractive index layer 20. The UV processor preferably used is Fusion V, Model MC-6RQN with H-bulb, made by Fusion UV Systems, Inc. of Gaithersburg, Md.

Alternatively, the coated subject can be thermally crosslinked by applying heat and a suitable radical initiator such as a peroxide compound.

The reaction mechanism is one in which the acrylate component of the fluoroalkyl-containing crosslinker reacts with the fluoropolymer backbone. To enhance this reaction, the fluoropolymer preferably has reaction site monomers (i.e. the fluoropolymer has a plurality of bromo-, iodo-, and chloro-containing cure sites) or other copolymers to provide further crosslinking sites.

EXAMPLES

The following paragraphs illustrate, via a specific set of example reactions and experimental methodologies, the improvements of each of the component steps for forming the low refractive index composition of the present invention.

A. Ingredients:

The ingredients used for forming the various coatings of this invention are summarized in the following paragraphs.

Dyneon™ THV™ 220 Fluoroplastic (20 MFI, ASTM D 1238) is available as either a 30% solids latex grade under the trade name of Dyneon™ THV™ 220D Fluoroplastic dispersion, or as a pellet grade under the trade name of Dyneon™ THV™ 220G. Both are available from Dyneon LLC of St. Paul, Minn. In the case of Dyneon™ THV™

220D, a coagulation step is necessary to isolate the polymer as a solid resin. The process for this is described below.

Dyneon™ FT 2430 and Dyneon™ FC 2145 fluoroelastomers are about 70 weight percent fluorine terpolymer and about 66 weight percent fluorine copolymers respectively, both available from Dyneon LLC of St. Paul, Minn. and were used as received.

Trimethylolpropane triacrylate SR 351 ("TMPTA") and Di-Pentaerythritol tri acrylate (SR 399LV) were obtained from Sartomer Company of Exton, Pa. and used as received.

Acryloyl chloride was obtained from Sigma-Aldrich and used without further purification.

3-methacryloxypropyltrimethoxysilane available as A174 OSI Specialties Chemical was used as received.

3-aminopropyl triethoxy silane (3-APS) is available form Aldrich Chemical of Milwaukee, Wis. and was used as received.

A1106-Silquest, manufactured by Osi Specialties (GE Silicones) of Paris, France.

"Darocur 1173" 2-hydroxy 2-methyl 1-phenyl propanone UV photoinitiator, and Irgacure™ 819 were obtained from Ciba Specialty Products of Terrytown, N.Y. and used as received.

"KB-1" benzyl dimethyl ketal UV photoinitiator was obtained from Sartomer Company of Exton, Pa. and was used as received.

Dowanol™, 1-methoxy-2-propanol was obtained from Sigma-Aldrich of Milwaukee, Wis. and used as received.

SR295, mixture of pentaerythritol tri and tetraacrylate, CN 120Z, Acrylated bisphenol A, SR339, Phenoxyethyl acrylate, were obtained from Sartomer Chemical Company of Exton, Pa. and used as received.

(3-Acryloxypropyl)trimethoxysilane, was obtain from Gelest of Morrisville, Pa. and was used as received.

A1230, polyether silane was obtained from OSI Specialties and was used as received.

Buhler zirconia (ZrO$_2$), grades Z-WO and Z-WOS, were obtained from Buhler, Uzweil Switzerland and modified as described in the preparation of (S3) and (S4) described below.

FBSEE (C$_4$F$_9$SO$_2$N(C$_2$H$_4$OH)$_2$), a fluorochemical diol, can be prepared as described in column 5, line 31 and in FIG. 9 of U.S. Pat. No. 3,734,962 (1973).

FBSAA (C$_4$F$_9$SO$_2$N(CH$_2$CH$_2$OC(O)CH=CH$_2$)$_2$) is prepared by the procedure in column 25 lines 49-63 of U.S. Pat. No. 6,238,798.

Oligomeric hexafluoropropylene oxide methyl ester (HFPO—C(O)OCH$_3$,) can be prepared according to the method reported in U.S. Pat. No. 3,250,808 (Moore et al.). The broad product distribution of oligomers obtained from this preparation can be fractionated according to the method described in U.S. patent application Ser. No. 10/331816, filed Dec. 30, 2002. This step yields the higher molecular weight distribution of oligomers used in this description wherein the number average degree of polymerization is about 6.3, and with an average molecular weight of 1,211 g/mol.

1. Preparation of hexafluoropropylene oxide N-methyl-1,3-propanediamine Adduct

A 1-liter round-bottom flask was charged with 291.24 g (0.2405 mol) of FC-1 and 21.2 g (0.2405 mol) N-methyl-1,3-propanediamine, both at room temperature, resulting in a cloudy solution. The flask was swirled and the temperature of the mixture rose to 45° C., and to give a water—white liquid, which was heated overnight at 55° C. The product was then placed on a rotary evaporator at 75° C. and 28 inches of Hg vacuum to remove methanol, yielding 301.88 g of a viscous slightly yellow liquid, the hexafluoropropylene oxide N-methyl-1,3-propanediamine adduct.

2. Preparation of HFPO-acrylate-(HFPO-1)

To a 250 ml roundbottom flask was charged with 4.48 g (15.2 mmoles, based on a nominal MW of 294) of trimethylolpropane triacrylate (TMPTA, Sartomer SR351), 4.45 g of tetrahydrofuran (THF), and 1.6 mg of phenothiazine and placed in an oil bath at 55C. Next, in a 100 ml jar was dissolved 20 g (15.78 mmole, MW 1267.15) hexafluoropropylene oxide N-methyl-1,3-propanediamine adduct in 32 g THF. This solution was placed in a 60 ml dropping funnel with pressure equalizing sidearm, the jar rinsed with about 3 ml of THF, which was also added to the dropping funnel. The contents of the funnel were added over 38 minutes under an air atmosphere to the TMPTA/THF/phenothiazine mixture. The reaction was cloudy at first, but cleared at about 30 minutes. Twenty minutes after the addition was complete, the reaction flask was placed on a rotary evaporator at 45-55 rpm under 28 inches of vacuum to yield 24.38 g of a clear, viscous yellow liquid, that was characterized by NMR and HPLC/mass spectroscopy.

3. Preparation of HFPO-C(O)N(H)C(CH$_2$OH)$_2$CH$_2$CH$_3$ Starting Material

To a 500 ml 3 necked flask equipped with a stir bar and reflux condenser was charged 11.91 g (0.1 mol) H$_2$NC(CH$_2$OH)$_2$CH$_2$CH$_3$ and 60 g THF. Next via dropping funnel was added 121.1 g (0.1 mol) HFPO-C(O)OCH$_3$ over about 80 min at a bath temperature of about 85 degrees Celsius. The reaction was cloudy at first, but became clear about 1 h into the reaction. After addition was complete, the heating bath was shut off and the reaction was allowed to cool for 3 days. The material was concentrated at 55 degrees Celsius under aspirator vacuum to yield 130.03 g of a light-colored syrup. NMR analysis showed the product to be an 87:13 mixture of the structures (5) and (6) as follows:

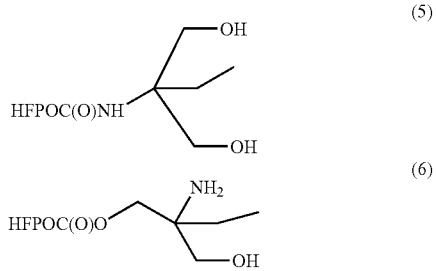

4. Preparation of HFPO-acrylate-(HFPO-3)

To a 250 ml 3 necked round bottom flask equipped with overhead stirrer was charged 65 g (0.05 mol) of HFPO-C(O)N(H)C(CH$_2$OH)$_2$CH$_2$CH$_3$, the product mixture generated above, 12.65 g (0.125 mol) triethylamine and 65 g ethyl acetate. To the flask at room temperature was added 11.31 g(0.125 mol) acryloyl chloride using a pressure-equalizing dropping funnel over 12 min, with the reaction temperature rising from 25 to a maximum of 40° C. The dropping funnel was rinsed with 5 g additional ethyl acetate that was added to the reaction flask, that was then placed in a 40° C. bath and allowed to react for 2 hours and 10 min additional time. The organic layer was then successively washed with 65 g 2% aqueous sulfuric acid, 65 g 2% aqueous sodium bicarbonate, and 65 g water, dried over anhydrous magnesium sulfate, filtered, treated with 16 mg methoxyhydroquinone (MEHQ), and concentrated on a rotary evaporator at 45° C. to yield 62.8 g of crude product. The next 35 g of this material was chromatographed on 600 ml of silica gel (SX0143U-3, Grade 62, 60-200 mesh, EM Science) using 25:75 ethyl acetate: heptane as an eluent. The first two fractions were 250 ml in volume, the remaining fractions were 125 ml in volume. Fractions 4-10 were combined, 8 mg MEHQ was added to the fractions, and solvent was removed on a rotary evaporator at 55C to provide 25.36 g of product that was analyzed by NMR, and found to be an 88:12 mixture of the structures (7) and (8).

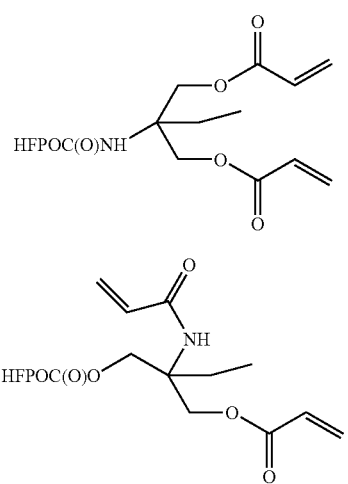

(7)

(8)

5. Preparation of Modified 20-nm Colloidal Silicon Dioxide Particles 15 g of 2327 (20-nm ammonium stabilized colloidal silica sol, 41% solids; Nalco, Naperville, Ill.) were placed in a 200 ml glass jar. A solution of 10 g of 1-methoxy-2-propanol (Aldrich) containing 0.57 g of vinyltrimethoxysilane (Gelest, Inc. of Tullytown, Pa.) was prepared in a separate flask. The vinyltrimethoxysilane solution was added to the glass jar while the silica sol was stirred. The flask was then rinsed with an additional 5-ml of solvent and added to the stirred solution. After complete addition, the jar was capped and placed in an oven at 90 degrees Celsius for about 20 hours. The sol was then dried by exposure to gentle airflow at room temperature. The powdery white solid was collected and dispersed in 50 ml of TfF solvent. 2.05 g of HMDS (excess) were slowly added to the THF silica sol, and, after addition, the jar was capped and placed in an ultrasonic bath for about 10 hours. Subsequently, the organic solvent was removed by a rotovap and the remaining white solid heated at 100 degrees Celsius overnight for further reaction and removal of volatile species. The resultant particles are noted below as vinyl modified/HMDS particles.

15 g of 2327 (20 nm ammonium stabilized colloidal silica sol, 41% solids; Nalco, Naperville, Ill.) were placed in a 200-ml glass jar. A solution of 10 g of 1-methoxy-2-propanol (Aldrich) containing 0.47 g of 3-(Trimethoxysilyl)propyl-methacrylate (Gelest, Inc., Tullytown, Pa.) was prepared in a separate flask. The 3-(Trimethoxysilyl)propylmethacrylate solution was added to the glass jar while the silica sol was stirred. The flask was then rinsed with an additional 5 ml of solvent and added to the stirred solution. After complete addition, the jar was capped and placed in an oven at 90 degrees Celsius for about 20 hours. The sol was then dried by exposure to gentle airflow at room temperature. The powdery white solid was collected and dispersed in 50 ml of THF solvent. 2.05 g of HMDS (excess) were slowly added to the THF silica sol, and, after addition, the jar was capped and placed in an ultrasonic bath for about 10 hours. Subsequently, the organic solvent was removed by a rotovap and the remaining white solid heated at 100 degrees Celsius overnight for further reaction and removal of volatile species. The resultant particles are noted below as A-174/HMDS particles.

6. Preparation of Modified Fumed Silica

The synthesis of partially acrylic-modified fumed $SiO_2$ was prepared by first making a sol of 2 g of $SiO_2$ (380 $m^2/g$) and 100 ml of 1-methoxy-2-propanol (Aldrich) in a glass jar. 4 g of ammonium hydroxide (30% aqueous solution) and 20 g distilled water were then added slowly into the solution upon stirring. The mixture became a gel. A solution of 20 g of 1-methoxy-2-propanol (Aldrich) containing 0.2 g of 3-(Trimethoxysilyl)propylmethacrylate (Aldrich) was prepared in a separate flask.

The (trimethoxysilyl)propylmethacrylate solution was added to the glass jar while stirring. The flask was then rinsed with an additional 5-10 ml of the solvent and subsequently added to the stirred solution. After complete addition, the jar was capped and placed in an ultrasonic bath at 80 degrees Celsius for between 6 and 8 hours. The solution was then dried in a flow-through oven at room temperature. The powdery white solid was collected and dispersed into 50 ml of THF solvent. 2.05 g of HMDS (excess) was slowly added to the THF powder solution, and, after addition, the jar was capped and placed in an ultrasonic bath for about 10 hours. Subsequently, the organic solvent was removed by a rotovap and the white solid was heated at 100 degrees Celsius overnight for further reaction and removal of volatile species. The resultant particles are noted below as A-174/F-$SiO_2$ particles.

7. Preparation of Particles modified by vinyltriethoxysilane and HMDS

By ultrasonication, a sol containing 2 g of fumed $SiO_2$ (380 $m^2/g$) and 100 ml of 1-methoxy-2-propanol (Aldrich) was prepared in a glass jar. 4 g of ammonium hydroxide (30% aqueous solution) and 20 g distilled water were then added slowly into the solution with stirring. The mixture became a gel. A solution of 20 g of 1-methoxy-2-propanol (Aldrich) containing 0.2 g of vinyl triethoxysilane (Gelest, Inc., Tullytown, Pa.) was prepared in a separate flask. The solution was added to the glass jar while stirring. The flask was then rinsed with an additional 5-10 ml of the solvent and added to the stirred solution. After complete addition, the jar was capped and placed in an ultrasonic bath at 80 degrees Celsius for between 6 to 8 hours. The solution was then dried in gentle airflow at room temperature. The powdery white solid was collected and dispersed into 50 ml of THF solvent. To the dispersed THF sol was slowly added 2.05 g of HMDS (excess). After addition, the jar was capped and placed in an ultrasonic bath for about 10 hours. Subsequently, the organic solvent was removed by a rotovap and the remaining white solid was heated at 100 degrees Celsius overnight for further reaction and removal of volatile species. The resultant particles are noted below as V/F—$SiO_2$ particles.

B. Experimentation and Verification

The following paragraphs illustrate, via a specific set of example reactions and experimental methodologies, the improvements of each of the component steps for forming the low refractive index composition of the present invention.

Example 1

Photocrosslinking Fluoropolymers with Fluoroalkyl Substituted Multiacrylate Exemplified by FBSAA Brominated fluoroelastomer E-15742, or iodinated fluoroelastomer E18402 were each dissolved individually in containers with either MEK or ethyl acetate at 10 weight percent by shaking at room temperature. The prepared fluoropolymer solutions were then combined with FBSAA in various ratios. The mixed fluoropolymer/FBSAA solutions were subsequently coated at a dry thickness of about 1-2 mil using a 40 mil thickness blocked coater onto PET or hardcoated PET. The coated films were dried briefly and subjected to heating at 100-140 degrees Celsius for 2 minutes.

Subsequently the films were subjected to UV (H-bulb) irradiation by 3 passes at the speed of 35 feet per minute. Alternatively, the films were subjected to UV irradiation from a 254-nm bulb using a similar approach. After UV irradiation, the cured films were removed from substrates and subsequently immersed into MEK solvent for dissolving the cured films. After overnight, the cured films remained insoluble as indicated in Table 1.

Example 2

Photocrosslinking Fluoropolymers with Hydrocarbon Multiacrylate TMPTA

Brominated fluoroelastomer E-15742, or iodinated fluoroelastomer E-18402 were each dissolved individually in containers with either MEK or ethyl acetate at 10 weight percent by shaking at room temperature. The prepared fluoropolymer solutions were then combined with TMPTA in various ratios. The mixed fluoropolymer/TMPTA solutions were subsequently coated at a dry thickness of about 1-2-mil using a 0-mil thickness blocked coater onto PET or hardcoated PET. The coated films were dried briefly, then subjected to heating at 100-140C for 2 minutes.

Subsequently the films were subjected to UV (H-bulb) irradiation by 3 passes at the speed of 35 feet per minute. Alternatively, the films were subjected to UV irradiation from a 254 nm bulb using a similar approach. After UV irradiation, the cured films were removed from substrates and subsequently immersed into MEK solvent for dissolving the cured films. After overnight, the cured films remained insoluble as indicated in Table 1.

Example 3

Photocrosslinking Fluoropolymers with Perfluoropolyether Substituted Multiacrylates (HFPO-acrylate-1 or HFPO-acrylate-3)

Brominated fluoroelastomer E-15742, or Iodinated fluoroelastomer E-18402 were each dissolved individually in containers with either MEK or ethyl acetate at 10 weight percent by shaking at room temperature. The prepared fluoropolymer solutions were then combined with HFPO-acrylate-1 or HFPO-acrylate-3 in various ratios. The mixed fluoropolymer/HFPO-acrylate-1 or fluoropolymer/HFPO-acrylate-3 solutions were subsequently coated at a dry thickness of about 1-2-mil using a 40-mil thickness blocked coater onto PET or a hardcoated PET. The coated films were dried briefly, then subjected to heating at 100-140 degrees Celsius for 2 minutes.

Subsequently the films were subjected to UV (H-bulb) irradiation by 3 passes at the speed of 35 feet per minute. Alternatively, the films were subjected to UV irradiation from a 254 nm bulb using a similar approach. After UV irradiation, the cured films were removed from substrates and subsequently immersed into MEK solvent for dissolving the cured films. After overnight, the cured films remained insoluble as indicated in Table 1.

Example 4

Photocrosslinking Fluoropolymers with Perfluoropolyether Substituted Multiacrylates (HFPO-acrylate-1) and A174 Modified Particles Brominated fluoroelastomer E-15742, or iodinated fluoroelastomer E-18402 were each dissolved individually in containers with either MEK or ethyl acetate at 10 weight percent by shaking at room temperature. The prepared fluoropolymer solutions were then combined with HFPO-acrylate-1 and A174 modified 20-nm sized $SiO_2$ in a ratio described in Table 1. The resultant solutions were subsequently coated at a dry thickness of about 1-2 mil using a 40 mil thickness blocked coater onto PET or a hardcoated PET. The coated films were dried briefly, then subjected to heating at 100-140 degrees Celsius for 2 minutes.

Subsequently the films were subjected to UV (H-bulb) irradiation by 3 passes at the speed of 35 feet per minute. Alternatively, the films were subjected to UV irradiation from a 254-nm bulb using a similar approach. After UV irradiation, the cured films were removed from substrates and subsequently immersed into MEK solvent for dissolving the cured films. After overnight, the cured films remained insoluble as indicated in Table 1.

TABLE 1

Crosslinking fluoropolymers with FBSAA, TMPTA and perfluoropolyether multiacrylates

| % E15742 | % E18402 | % FBSAA | % HFPO-acrylate-1 | % TMPTA | % HFPO-acrylate-3 | A174:HMDS (1:1) Modified particle | % KB-1 | Temp. Heated | Time Heated (min) | # of Passes under UV (H bulb) | Crosslinking Test |
|---|---|---|---|---|---|---|---|---|---|---|---|
| 97 | 3 | 0 | 0 | 0 | 0 | 0 | 1 | 120 | 5 | 3 | crosslinked |
| 95 | 5 | 0 | 0 | 0 | 0 | 0 | 1 | 120 | 5 | 3 | crosslinked |
| 93 | 7 | 0 | 0 | 0 | 0 | 0 | 1 | 120 | 5 | 3 | crosslinked |

TABLE 1-continued

Crosslinking fluoropolymers with FBSAA, TMPTA and perfluoropolyether multiacrylates

| % E15742 | % E18402 | % FBSAA | % HFPO-acrylate-1 | % TMPTA | % HFPO-acrylate-3 | A174:HMDS (1:1) Modified particle | % KB-1 | Temp. Heated | Time Heated (min) | # of Passes under UV (H bulb) | Crosslinking Test |
|---|---|---|---|---|---|---|---|---|---|---|---|
|  | 97 | 3 | 0 | 0 | 0 | 0 | 1 | 120 | 5 | 3 | crosslinked |
|  | 95 | 5 | 0 | 0 | 0 | 0 | 1 | 120 | 5 | 3 | crosslinked |
|  | 93 | 7 | 0 | 0 | 0 | 0 | 1 | 120 | 5 | 3 | crosslinked |
| 97 | 0 | 0 | 3 | 0 | 0 | 0 | 1 | 120 | 5 | 3 | crosslinked |
| 95 | 0 | 0 | 5 | 0 | 0 | 0 | 1 | 120 | 5 | 3 | crosslinked |
| 93 | 0 | 0 | 7 | 0 | 0 | 0 | 1 | 120 | 5 | 3 | crosslinked |
| 90 | 0 | 0 | 10 | 0 | 0 | 0 | 1 | 120 | 5 | 3 | crosslinked |
| 0 | 97 | 0 | 3 | 0 | 0 | 0 | 1 | 120 | 5 | 3 | crosslinked |
| 0 | 95 | 0 | 5 | 0 | 0 | 0 | 1 | 120 | 5 | 3 | crosslinked |
| 0 | 93 | 0 | 7 | 0 | 0 | 0 | 1 | 120 | 5 | 3 | crosslinked |
| 0 | 90 | 0 | 10 | 0 | 0 | 0 | 1 | 120 | 5 | 3 | crosslinked |
| 95 | 0 | 0 | 0 | 5 | 0 | 0 | 1 | 120 | 5 | 3 | crosslinked |
| 90 | 0 | 0 | 0 | 10 | 0 | 0 | 1 | 120 | 5 | 3 | crosslinked |
| 0 | 95 | 0 | 0 | 5 | 0 | 0 | 1 | 120 | 5 | 3 | crosslinked |
| 0 | 90 | 0 | 0 | 10 | 0 | 0 | 1 | 120 | 5 | 3 | crosslinked |
| 95 | 0 | 0 | 0 | 0 | 5 | 0 | 1 | 120 | 5 | 3 | crosslinked |
| 90 | 0 | 0 | 0 | 0 | 10 | 0 | 1 | 120 | 5 | 3 | crosslinked |
| 0 | 95 | 0 | 0 | 0 | 5 | 0 | 1 | 120 | 5 | 3 | crosslinked |
| 0 | 90 | 0 | 0 | 0 | 10 | 0 | 1 | 120 | 5 | 3 | crosslinked |
| 65 | 0 | 0 | 0 | 0 | 5 | 30 | 1 | 120 | 5 | 3 | crosslinked |
| 0 | 65 | 0 | 0 | 0 | 5 | 30 | 1 | 120 | 5 | 3 | crosslinked |

Example 5

Scratch Resistance Test on Control Fluoropolymers After UV Treatment

Brominated fluoroelastomer E-15742, or iodinated fluoroelastomer E-18402 were each dissolved individually in containers with either MEK or ethyl acetate at 3 weight percent by shaking at room temperature. The prepared fluoropolymer solutions were subsequently coated at a dry thickness of about 100 nm using a number 3 metering rod obtained from GARDCO onto hardcoated PET. The coated films were dried briefly, then subjected to heating at 100-140 C for 2 minutes.

Subsequently, the films were subjected to UV (H-bulb) irradiation by 3 passes at the speed of 35 feet per minute. After UV irradiation, the scratch resistance of the cured films were evaluated as indicated in Table 2.

Example 6

Scratch Resistance Test on Fluoropolymers Photocrosslinked by Fluoroalkyl Substituted Multiacrylate Exemplified by FBSAA Brominated fluoroelastomer E-15742, or iodinated fluoroelastomer E18402 were each dissolved individually in containers with either MEK or ethyl acetate at 10 weight percent by shaking at room temperature. The prepared fluoropolymer solutions were then combined with FBSAA in various ratios. The mixed fluoropolymer/FBSAA solutions were subsequently coated at a dry thickness of about 100 nm using a number 3 metering rod obtained from GARDCO onto hardcoated PET. The coated films were dried briefly, then subjected to heating at 100-140 degrees Celsius for 2 minutes.

Subsequently the films were subjected to UV (H-bulb) irradiation by 3 passes at the speed of 35 feet per minute. After UV irradiation, the scratch resistance of the cured films were evaluated as indicated in Table 2.

Example 7

Scratch Resistance Test on Fluoropolymers Photocrosslinked by Hydrocarbon Multiacrylate TMPTA Brominated fluoroelastomer E-15742, or iodinated fluoroelastomer E18402 were each dissolved individually in containers with either MEK or ethyl acetate at 10 weight percent by shaking at room temperature. The prepared fluoropolymer solutions were then combined with TMPTA in various ratios. The mixed fluoropolymer/TMPTA solutions were subsequently coated at a dry thickness of about 100 nm using a number 3 metering rod obtained from GARDCO onto hardcoated PET. The coated films were dried briefly, then subjected to heating at 100-140C for 2 minutes.

Subsequently the films were subjected to UV (H-bulb) irradiation by 3 passes at the speed of 35 feet per minute. After UV irradiation, the scratching resistance of the cured films were evaluated as indicated in Table 2.

Example 8

Scratch Resistance Test on Fluoropolymers Photocrosslinked by Perfluoropolyether Substituted Multiacrylates (HFPO-acrylate-1 or HFPO-acrylate-3)

Brominated fluoroelastomer E-15742, or iodinated fluoroelastomer E-18402 were each dissolved individually in containers with either MEK or ethyl acetate at 10 weight percent by shaking at room temperature. The prepared fluoropolymer solutions were then combined with HFPO-acrylate-1 or HFPO-acrylate-3 in various ratios. The mixed fluoropolymer/HFPO-acrylate-1 (or fluoropolymer/HFPO-acrylate-3) solutions were subsequently coated at a dry thickness of about 100 nm using a number 3 metering rod obtained from GARDCO onto hardcoated PET. The coated films were dried briefly, then subjected to heating at 100-140 degrees Celsius for 2 minutes.

Subsequently the films were subjected to UV (H-bulb) irradiation by 3 passes at the speed of 35 feet per minute. After UV irradiation, the scratch resistance of cured films were evaluated as indicated in Table II.

Example 9

Scratch Resistance Test on Fluoropolymers Photocrosslinked by Perfluoropolyether Substituted Multiacrylates (HFPO-acrylate-1) and A174 Modified Particles Brominated fluoroelastomer E-15742, or iodinated fluoroelastomer E-18402 were each dissolved individually in containers with either MEK or ethyl acetate at 10 weight percent by shaking at room temperature. The prepared fluoropolymer solutions were then combined with HFPO-acrylate-1 and A174 modified 20 nm sized $SiO_2$ in a ratio described in Table I. The mixed fluoropolymer/HFPO-acrylate-1 and A174 modified 20 nm sized$_{SiO2}$ solutions were subsequently coated at a dry thickness of about 100 nm using a number 3 metering rod obtained from GARDCO onto hardcoated PET. The coated films were dried briefly, then subjected to heating at 100-140 degrees Celsius for 2 minutes.

Subsequently the films were subjected to UV (H-bulb) irradiation by 3 passes at the speed of 35 feet per minute. After UV irradiation, the scratching resistance of the cured films were evaluated as indicated in Table 2.

refractive index composition can be enhanced by the addition of surface functionalized nanoparticles into the fluoropolymer compositions. Providing functionality to the nanoparticles enhances the interactions between the fluoropolymers and such functionalized particles. Further, the introduction of HFPO moieties with and without compatibilizers also showed improvement over the standard composition. Fluoropolymers as seen in Table 1 can be crosslinked by fluorinated multifunctional olefinic crosslinkers confirmed by solvent swelling tests.

While the invention has been described in terms of preferred embodiments, it will be understood, of course, that the invention is not limited thereto since modifications may be made by those skilled in the art, particularly in light of the foregoing teachings.

What is claimed is:

1. A low refractive index composition for use in an antireflection coating for an optical display, the composition comprising the reaction product of:
    a fluoropolymer selected from the group consisting of a Br-containing fluoroelastomer, an I-containing fluoroelastomer, a CN-containing fluoroelastomers, and mixtures thereof, wherein the fluoropolymer is formed from TFE, HFP, VDF, and at least one halogen-containing cure site monomer, halogen-containing chain transfer agent, or CN-containing cure site monomer; and
    a fluoroalkyl-containing perfluoropolyether multi-acrylate crosslinker; and
    a plurality of surface modified inorganic nanoparticles.

2. The composition of claim 1, wherein said perfluoropolyether multi-acrylate crosslinker comprises a HFPO moiety.

TABLE 2

Improved scratching resistance by crosslinking with fluoroalkyl multiacrylate and optional surface modified particles

| Substrate | Wt % | % E15742 | % E18402 | % 132347-90 (multi functional acrylate) | A174:H MDS (1:1) Modified particle | % KB-1 | Coat Bar used | Temp. Heated | Time Heated (min) | # of Passes under UV (H bulb) | Scratch Test (10 Times) |
|---|---|---|---|---|---|---|---|---|---|---|---|
| Hard Coat | 0 | 100 | 0 | 0 | 0 | 1 | 100 nm | 120 | 5 | 3 | Heavily scratched |
| Hard Coat | 0 | 0 | 100 | 0 | 0 | 1 | 100 nm | 120 | 5 | 3 | Heavily scratched |
| Hard Coat | 3 | 97 | 0 | 3 | 0 | 1 | 100 nm | 120 | 5 | 3 | Light scratch |
| Hard Coat | 3 | 95 | 0 | 5 | 0 | 1 | 100 nm | 120 | 5 | 3 | Light scratch |
| Hard Coat | 3 | 93 | 0 | 7 | 0 | 1 | 100 nm | 120 | 5 | 3 | Light scratch |
| Hard Coat | 3 | 90 | 0 | 10 | 0 | 1 | 100 nm | 120 | 5 | 3 | Light scratch |
| Hard Coat | 3 | 0 | 97 | 3 | 0 | 1 | 100 nm | 120 | 5 | 3 | Light scratch |
| Hard Coat | 3 | 0 | 95 | 5 | 0 | 1 | 100 nm | 120 | 5 | 3 | Light scratch |
| Hard Coat | 3 | 0 | 93 | 7 | 0 | 1 | 100 nm | 120 | 5 | 3 | Light scratch |
| Hard Coat | 3 | 0 | 90 | 10 | 0 | 1 | 100 nm | 120 | 5 | 3 | Light scratch |
| Hard Coat | 3 | 65 | 0 | 5 | 30 | 1 | 100 nm | 120 | 5 | 3 | Light scratch |
| Hard Coat | 3 | 0 | 65 | 5 | 30 | 1 | 100 nm | 120 | 5 | 3 | Light scratch |

As Tables 1 and 2 confirm, the low refractive index compositions introducing a fluoroalkyl-containing multi-olefinic crosslinker to a fluoropolymer showed improved mechanical properties in terms of scratch resistance as compared with coatings not introducing a fluoro-component to the crosslinker (i.e. consisting strictly of a hydrocarbon-based multi-olefinic crosslinker—or the standard). Further, the mechanical strength and scratch resistance the low 3. The composition of claim 1, wherein said crosslinker comprises at least one monovalent C1 to C8 fluoroalkyl moiety.

4. The composition of claim 1, wherein said crosslinker comprises at least one monovalent C1 to C8 fluoroalkylene moiety.

5. The composition of claim 1 further comprising a compatibilizer selected from the group consisting of a fluoroalkyl-substituted monoacrylate, a fluoroalkyl-substituted multiacrylate, a fluoroalkylene-substituted monoacrylate and a fluoroalkylene-substituted multi-acrylate.

6. The composition of claim 5, wherein said compatibilizer is selected from the group consisting of $C_4F_9SO_2N(CH_3)CH_2CH_2OC(O)CH=CH_2$, $C_4F_9SO_2N(CH_2CH_2OC(O)CH=CH_2)_2$, and $C_4F_9SO_2N(CH_3)CH_2CH_2OC(O)C(CH_3)=CH_2$.

7. The composition of claim 5, wherein said compatibilizer comprises a thiol or a polythiol compatibilizer.

8. The composition of claim 7, wherein said thiol or polythiol compatibilizer is selected from the group consisting of $C_4F_9SO_2N(CH_3)CH_2CH_2OC(O)CH_2SH$, $C_4F_9SO_2N(CH_3)CH_2CH_2OC(O)CH_2CH_2SH$, $C_4F_9SO_2N(CH_3)CH_2CH_2SH$, and $C_4F_9SO_2N(CH_3)CH(OC(O)CH_2SH)CH_2OC(O)CH_2SH$.

9. The composition of claim 1, wherein said crosslinker has the chemical formula: $R_{fpe}Q(X)_n$,
wherein $R_{fpe}$ is a residue of a monovalent HFPO moiety;
wherein Q is a connecting group selected from the group consisting of an alkylene group, an arylene group, an arylene-alkylene group, and an alkylene-arylene group, optionally containing heteroatoms;
wherein X is a free-radically reactive group selected from the group consisting of a meth(acryl) reactive group, an allyl reactive group, and a vinyl reactive group; and
wherein n is 2 to 3.

10. The composition of claim 9, wherein Q is selected from the group consisting of $—(CH_2)_m—$; $—CH_2O(CH_2)_3—$; and $—C(O)NRCH_2CH_2—$, where R is an H or lower alkyl of 1 to 4 carbon atoms and m is 1 to 6.

11. An antireflection film having a layer of the composition of claim 1 having a refractive index of less than 1.5, said antireflection film further comprising a high refractive index layer, having a refractive index of greater than 1.5, coupled to said layer of said low refractive index material.

12. An optical device comprising a layer of said low refractive index material formed according to claim 1.

13. A low refractive index composition for use in an antireflection coating for an optical display, the composition comprising the reaction product of:
i) a fluoropolymer selected from the group consisting of a Br-containing fluoroelastomer, an I-containing fluoroelastomer, a CN-containing fluoroelastomers, and mixtures thereof, wherein the fluoropolymer is formed from TFE, HFP, VDF, and at least one halogen-containing cure site monomer, halogen-containing chain transfer agent, or CN-containing cure site monomer;
ii) a fluoroalkyl-containing multi-olefinic crosslinker; and
iii) a plurality of surface modified nanoparticles.

14. A method for forming an optically transmissive, stain and ink repellent, durable optical display comprising:
providing an optical display having an optical substrate;
forming a low refractive index polymer composition comprising
a fluoropolymer selected from the group consisting of
a Br-containing fluoroelastomer,
an I-containing fluoroelastomer, a CN-containing fluoroelastomers, and mixtures thereof,
wherein the fluoropolymer is formed from TFE, HFP, VDF, and at least one halogen-containing cure site monomer, halogen-containing chain transfer agent, or CN-containing cure site monomer;
a fluoroalkyl-containing perfluoropolyether multi-acrylate crosslinker; and
a plurality of surface modified nanoparticles;
applying a layer of said low refractive index polymer composition to said optical substrate; and
curing said layer to form a cured film.

15. The method of claim 14, wherein providing an optical display comprises provided an optical display having a hard coat layer applied to an optical substrate.

16. The method of claim 14, wherein forming a low refractive index polymer composition comprises reactively coupling the fluoropolymer and the crossliniker.

17. The composition of claim 1 wherein when applied as layer to a substrate forms a coating layer having a refractive index of less than about 1.5.

18. The composition of claim 1 wherein when applied as layer to a substrate forms a coating layer having a refractive index of less than about 1.45.

19. The composition of claim 1 wherein when applied as layer to a substrate forms a coating layer having a refractive index of less than about 1.42.

* * * * *

UNITED STATES PATENT AND TRADEMARK OFFICE
CERTIFICATE OF CORRECTION

PATENT NO. : 7,351,471 B2
APPLICATION NO. : 11/026754
DATED : April 1, 2008
INVENTOR(S) : Naiyong Jing It is certified that error appears in the above-identified patent and that said Letters Patent is hereby corrected as shown below:

Column 6
Line 55, Delete "fluorelastomeric" and insert -- fluoroelastomeric --, therefor.

Column 7
Line 51, Delete "descriptions" and insert -- description --, therefor.

Column 8
Line 9, Delete "perfluoroinated" and insert -- perfluorinated --, therefor.
Line 13, Delete "al," and insert -- al., --, therefor.
Line 14, Delete "photochemcially" and insert -- photochemically --, therefor.

Column 9
Line 6, Delete "=CH2)2." And insert -- =CH$_2$)$_2$. --, therefor.
Line 44, Delete "Rfpe" and insert -- R$_{fpe}$ --, therefor.

Column 10
Line 26, Delete "fluoroinated" and insert -- fluorinated --, therefor.
Line 36, Delete "hexamethydisilizane" and insert -- hexamethyldisilizane --, therefor.

Column 12
Line 38, Delete "V," and insert -- UV, --, therefor.

Column 15
Line 50, Delete "TfF" and insert -- THF --, therefor.

Column 18
Line 7, Delete "lodinated" and insert -- Iodinated --, therefor.

UNITED STATES PATENT AND TRADEMARK OFFICE
CERTIFICATE OF CORRECTION

PATENT NO. : 7,351,471 B2
APPLICATION NO. : 11/026754
DATED : April 1, 2008
INVENTOR(S) : Naiyong Jing It is certified that error appears in the above-identified patent and that said Letters Patent is hereby corrected as shown below:

Column 24
Line 32, In Claim 16, delete "crossliniker." and insert -- crosslinker. --, therefor.

Signed and Sealed this

First Day of July, 2008

JON W. DUDAS
*Director of the United States Patent and Trademark Office*